United States Patent [19]

Trentham et al.

[11] Patent Number: 4,465,614
[45] Date of Patent: Aug. 14, 1984

[54] ALKANOLAMINIUM CARBOXYLATE SOLVENTS FOR SELECTIVE $SO_2$ ABSORPTION

[75] Inventors: H. Lee Trentham, Galveston; John H. Crow, Houston, both of Tex.; Farwell C. Boston, Shreveport, La.

[73] Assignee: Trentham Corporation, Houston, Tex.

[21] Appl. No.: 411,709

[22] Filed: Aug. 26, 1982

Related U.S. Application Data

[62] Division of Ser. No. 260,308, May 4, 1981, Pat. No. 4,363,791.

[51] Int. Cl.$^3$ ................................................ B01F 1/00
[52] U.S. Cl. .................................... 252/364; 252/184; 423/243; 423/575
[58] Field of Search ...................... 252/364, 184, 546; 423/243, 575; 260/501.17

[56] References Cited

U.S. PATENT DOCUMENTS

| | | | |
|---|---|---|---|
| 3,658,462 | 4/1972 | Van Scoy | 423/243 |
| 3,904,735 | 9/1975 | Atwood et al. | 423/243 |
| 4,113,849 | 9/1978 | Atwood | 423/574 R |
| 4,126,586 | 11/1978 | Curtis et al. | 252/524 |
| 4,170,628 | 10/1979 | Kosseim et al. | 423/243 |
| 4,222,993 | 9/1980 | Hölter et al. | 423/243 |
| 4,320,101 | 3/1982 | Trentham et al. | 423/243 |

*Primary Examiner*—Richard D. Lovering
*Assistant Examiner*—Anne Brooks
*Attorney, Agent, or Firm*—Pravel, Gambrell, Hewitt, Kirk & Kimball

[57] ABSTRACT

Aqueous solutions comprising from about 35 to about 85% by weight of an alkanolaminium carboxylate have proven to be highly efficient absorption solvents for sulfur dioxide. Such solvents preferentially absorb sulfur dioxide from the gas streams containing large quantities of carbon dioxide. The rate at which dissolved sulfur dioxide oxidizes to non-regenerable sulfate salts is significantly reduced by such solvents.

6 Claims, 1 Drawing Figure

ALKANOLAMINIUM CARBOXYLATE SOLVENTS FOR SELECTIVE SO₂ ABSORPTION

This is a division of application Ser. No. 260,308 filed May 4, 1981, now U.S. Pat. No. 4,363,791, issued on Mar. 16, 1982.

BACKGROUND OF THE INVENTION

This invention relates to a solvent composition which selectively absorbs sulfur dioxide from effluent gases containing carbon dioxide. More particularly, this invention relates to the discovery that an aqueous alkanolaminium carboxylate solution preferentially absorbs sulfur dioxide, has a high absorption capacity for sulfur dioxide, and suppresses the rate at which absorbed sulfur dioxide oxidizes to non-regenerable sulfate salts. Compared to other known sulfur dioxide absorption solutions, solvents of this invention have lower heats of desorption and hence may be thermally stripped of dissolved sulfur dioxide more easily and economically than other known selective sulfur dioxide absorption solvents.

Many important industrial units produce vent gas streams containing sulfur dioxide and carbon dioxide. Sulfur dioxide is a pollutant and must be removed from such gas streams before they may be safely or legally vented to the atmosphere. One prime example of a process which generates a gas stream requiring treatment is the hydrodesulfurization of petroleum stocks. In hydrodesulfurization the sulfur content of petroleum is converted to and removed as hydrogen sulfide. The hydrogen sulfide gas stream is then often treated by the Claus process to recover the sulfur values thereof as elemental sulfur. However, sulfur recovery by the Claus process is not complete and a tail gas is produced which may contain from 3% to 15% of the original sulfur values, predominately as a mixture of hydrogen sulfide and sulfur dioxide, together with considerable quantities of carbon dioxide. In the past, Claus patent tail gases have been incinerated to convert toxic hydrogen sulfide to sulfur dioxide and the gas stream vented to the atmosphere. Another prime source of sulfur dioxide effluent gases is the combustion of sulfur-containing fossil fuels in the production of power, generally electrical power. Combustion of high sulfur fuels produces stack gases containing large volumes of carbon dioxide and objectionable quantities of sulfur dioxide. Such gases must be treated to remove sulfur dioxide before they may be safely vented to the atmosphere.

A number of non-reversible absorption or absorption processes have been proposed for removing sulfur dioxide from such gas streams prior to venting them to the atmosphere. Many proposed processes react sulfur dioxide with limestone or other inorganic compounds, in solid or solution form, to remove sulfur dioxide as a sulfite or sulfate salt. However, such methods require the use of uneconomically large quantities of reagents in greater than stoichiometric amounts and produce large quantities of waste solids or liquids which themselves require disposal, thus presenting secondary pollution problems.

Processes for the reversible absorption of sulfur dioxide in a regenerable solvent have been suggested. Thus, alkali and alkaline earth metal hydroxides and carbonates, ammonium hydroxide and aqueous ammonia have been tried as regenerable sulfur dioxide solvents. However, such solvents have exhibited poor sulfur dioxide pick-up, low sulfur dioxide absorption capacity, extremely high stream stripping requirements and side stream reactions such as sulfur dioxide disproportionation or oxidation to produce non-regenerable sulfate salts which accumulate within the solvent and diminish its capacity to absorb sulfur dioxide. These and other disadvantages have made the use of such solvents unattractive.

Likewise, amines have been suggested as regenerable sulfur dioxide solvents but have been found unsatisfactory. Amines are reported to absorb sulfur dioxide by, at least in part, an irreversible reaction that produces dithionates which cannot be regenerated by thermal stripping. Further, at stripping temperatures above about 212° F. dissolved sulfur dioxide irreversibly reacts with amines to produce organic sulfur compounds and polymeric products.

Recently, U.S. Pat. No. 3,904,735 has reported that certain trialkanolamines and their alkoxylated and sulfite derivatives, when used under specific processing restrictions, may be employed as selective regenerable solvents for the absorption of sulfur dioxide from gases which also contain carbon dioxide. The utility of such solvents was predicated upon the discovery that triethanolamine which otherwise would be subject to the problems of sulfur dioxide disproportionation and solvent degradation undergoes such adverse side reactions only to a negligible extent when certain critical processing conditions are closely observed. Particularly, the absorption temperature must not exceed 212° F., the stripping temperature must not exceed 266° F., and at least one mole of water for each mole of absorbed sulfur dioxide must be maintained in the solvent. Additionally, triethanolamine was unexpectedly found to be the least active of the possible trialkanolamine solvents in promoting the oxidation of dissolved sulfur dioxide to non-regenerable sulfate salts.

SUMMARY OF THE INVENTION

It has now been found that alkanolaminium carboxylates are suitable for use as selective sulfur dioxide absorption solvents. Alkanolaminium carboxylates are highly selective for sulfur dioxide, possess a high sulfur dioxide absorption capacity and may be regenerated at lower heat requirements than other selective sulfur dioxide absorption solvents. Additionally, alkanolaminium carboxylate solvents have been found to maintain their pH value when loaded with dissolved sulfur dioxide or accumulated sulfates at pH values of about 3.0 or greater, thereby substantially reducing the rate at which dissolved sulfur dioxide oxidizes to non-regenerable sulfate salts. The low rate of sulfate formation permits an alkanolaminium carboxylate solvent to be effectively purged of sulfates by continuous side stream treatment of a minor amount of the solvent. The alkanolaminium carboxylate solvents resist degradation when sulfates are continuously purged by side stream treatments.

DESCRIPTION OF THE PREFERRED EMBODIMENTS

Figure 1:
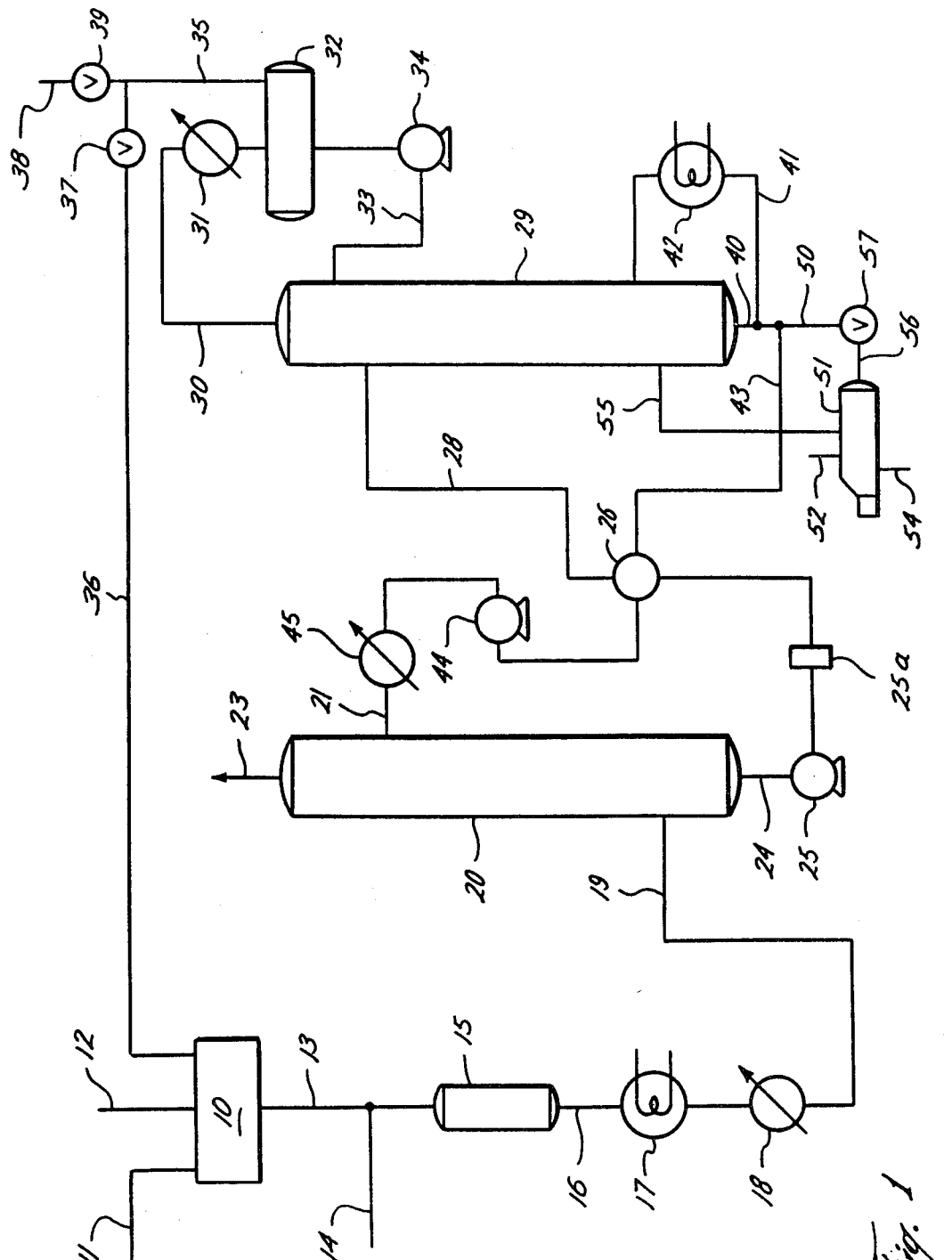

The selective solvents of this invention are aqueous solutions of alkanolaminium carboxylates containing from about 15% to about 97% by weight water and from about 85% to about 3% by weight of an alkanolaminium carboxylate. The preferred composition for such solvents is from about 15% to about 65% by weight water and most preferably from about 40% to about 50% by weight water, and from about 85% to about 35% by weight alkanolaminium carboxylate and most preferably about 60% to 50% by weight alkanolaminium carboxylate.

Alkanolaminium carboxylates which are suitable for use in the solvents of this invention are those having the following formula:

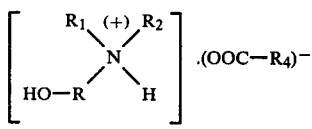

wherein R is a alkylene group having from 2 to 4 carbon atoms, $R_1$ and $R_2$ are each independently an alkanol group having from 2 to 4 carbon atoms or an alkyl group of from 1 to 4 carbon atoms or a hydrogen atom, and $R_4$ is an alkyl group of from 1 to 3 carbon atoms. The preferred alkanolaminium carboxylates are those derived from the reaction of acetic, propionic, or butyric acid with triethanolamine (TEA), methyldiethanolamine (MDEA), monoethanolamine (MEA), diisopropanolamine (DIPA) or diethanolamine (DEA).

It is believed that such alkanolaminium carboxylates derive their selectivity for sulfur dioxide absorption as compared to carbon dioxide from the fact that the anionic carboxylate group is not displaceable from the cationic alkanolaminium by carbon dioxide (in the form of carbonic acid) but is displaceable therefrom by sulfurous acid which forms upon the absorption of sulfur dioxide in aqueous solutions.

The alkanolaminium carboxylates of choice are those produced by the reaction of acetic acid with triethanolamine and methyldiethanolamine. The preferred alkanolaminium carboxylates are methyldiethanolaminium acetate and triethanolaminium acetate.

Generally, the alkanolaminium carboxylate solvent may be formulated to contain from about 15% weight to about 97% weight water. As the water content of the solvent increases the temperature at which the solvent may be effectively thermally stripped of dissolved sulfur dioxide decreases. However, as the amount of water is increased, the solvent's capacity to absorb sulfur dioxide correspondingly decreases. Preferably, the water content of the solvent is about 15 to about 65% by weight, and optimumly may be from about 40 to about 50% by weight.

Referring to FIG. 1, the present invention is described as applied to a conventional Claus-type process for the production of sulfur. In a Claus-type sulfur recovery unit, hydrogen sulfide is converted to elemental sulfur by oxidation. However, a Claus reaction will not go to completion and elemental sulfur recoveries will generally range from 85% to 97%. The remaining sulfur values remain in the gas phase predominately as $H_2S$ and $SO_2$ and must be treated for recovery before the tail gas may be safely vented to the atmosphere.

According to the present invention, an absorption solution comprising an aqueous solution of alkanolaminium carboxylate has been found to preferentially absorb sulfur dioxide from gaseous mixtures. In one of the preferred embodiments this discovery is utilized in conjunction with the Claus-type sulfur recovery unit wherein all sulfur-containing matter in the Claus tail gas is converted by oxidation to sulfur dioxide which can then be absorbed by the aqueous alkanolamine carboxylate solvents, according to this invention.

In FIG. 1 hydrogen sulfide is supplied to the Claus unit 10 by line 11. Air or oxygen is introduced to unit 10 by line 12. Because of the incomplete conversion of a Claus-type unit, sulfur-containing compounds remain in the tail gas stream 13 such as hydrogen sulfide, sulfur vapor, sulfur dioxide and possibly some carbonyl sulfide and carbon disulfide. The tail gas also contains appreciable quantities of carbon dioxide and other gas components such as nitrogen as diluents.

Oxygen is added by line 14 to the tail gas in line 13 and the combined gas mixture is introduced to a sulfur oxidizer 15. Sulfur oxidizer 15 converts all of the sulfur values in the tail gas to sulfur dioxide. The oxidized tail gas then passes by line 16 through a waste heat recovery unit 17 and, if necessary, through a second cooler 18 whereby the gas temperature may be cooled to a suitable temperature for $SO_2$ absorption. The tail gas gas is cooled to a temperature of from about 75° to about 150° F., and preferably to a temperature of about 130° F. in most cases.

The cooled gas stream containing the sulfur dioxide is passed by line 19 into the bottom of a countercurrent gas/liquid absorption unit 20 which contains a number of vapor/liquid contacting stages. The sulfur dioxide content of the gas stream is preferentially absorbed in absorption unit 20 by contact with the aqueous alkanolaminium carboxylate solvents of this invention. The aqueous alkanolaminium carboxylate solution is supplied to the upper portion of unit 20 through line 21. Sulfur-free gas is removed through vent line 23. The line 19 gaseous mixture may contain small amounts of sulfur trioxide although the sulfur dioxide predominates. The gas stream is intimately contacted in countercurrent flow with the aqueous alkanolaminium carboxylate solution resulting in essentially all of the sulfur oxides being preferentially absorbed. The solution containing the absorbed sulfur dioxide is removed from the bottom of unit 20 through line 24 where it is pumped by pump 25 through a heat exchanger 26. A filter 25a may be employed between pump 25 and heat exchanger 26. After passing through the heat exchanger 26, the solution containing absorbed sulfur dioxide is then passed through line 28 through a regenerating vessel 29 wherein the solution is stripped of dissolved $SO_2$ and hence made ready for recirculation to the absorption unit 20.

The regenerating vessel 29 may be a distillation column wherein the solution is introduced into the upper portion of the column for regeneration. The sulfur dioxide gas is removed from the boiling solution in vessel 29 and flows from the top of vessel 29 through line 30 wherein it is cooled by cooler 31. In cooling the separated gaseous stream, a certain amount of water is condensed and collected in vessel 32 wherein it is recycled through line 33 by pump 34 and reintroduced into the top of column 29 at a point above the introduction of the solution containing the absorbed sulfur dioxide to prevent loss of the alkanolaminium carboxylate from vessel 29. The concentrated sulfur dioxide stream is removed from vessel 32 by line 35 wherein it may be recycled by line 36 back to the Claus-type sulfur recovery unit 10 where it is converted into sulfur. A valve 37 in line 36 may control the amount recycled or the concentrated sulfur dioxide stream may be removed through line 38 which is controlled by valve 39.

The alkanolaminium carboxylate solution which has been stripped of sulfur dioxide is removed from the bottom of vessel 29 by line 40. The heating recycle stream may be taken from line 40 through line 41 for addition of heat to column 29, the heat being added through a heat exchanger 42 and recycle line 41. The regenerated or sulfur dioxide lean alkanolaminium carboxylate solution is recirculated through line 43 through a heat exchanger 26 where it is then passed on through a pump 44 to cooler 45 prior to reintroduction into unit 20 through line 21.

A solution purification cycle is provided whereby a portion of the alkanolaminium carboxylate solution which has been stripped of sulfur dioxide is removed from line 40 through line 50 whereby it is introduced into a purifier 51. Soda ash may be added by line 52 to the alkanolaminium carboxylate in purifier 51 to cause the precipitation of accumulated sulfate salts as sodium sulfate which is removed from solution by line 54. The purified alkanolaminium carboxylate solution is then recirculated through line 55 to vessel 29. The amount of solution passing through the purification cycle may be controlled by a level device 56 and valve 57 in line 50. The purification cycle, therefore, permits non-regenerable sulfate salts to be continuously purged from the alkanolaminium carboxylate solution to thereby keep the accumulation of such salts in solution below a predetermined level. Occasionally it will be necessary to evacuate the solvent solution from purifier 51 and clean the vessel of non-volatile residues that accumulate therein over periods of continuous operation.

The solvents of the present invention may also be employed to absorb sulfur dioxide from various gas streams, for example, the gas stream vented from the regenerator of a conventional oil refinery catalytic cracking unit, the flue gas from a power plant using high sulfur fuels, such as coal or other like sulfur dioxide-containing gases.

Studies upon the rate at which dissolved sulfur dioxide oxidizes to sulfate in alkanolaminium carboxylate solvents have shown that oxidation presents no serious problem provided that a portion of the solvent is continuously purged to keep the accumulated sulfate at a level in the solvent of 0.29 normal or less. When accumulated sulfate is maintained at 0.29 normal or less the rate of sulfate accumulation is about 1% of inlet sulfur dioxide equivalent. Thus, it is only required that about 1 to 1.5% of the total solvent circulated through the system be treated in the side stream purifier to maintain accumulated sulfates at a constant level at or below 0.29 normal in the solution.

EXAMPLE 1

Three aqueous alkanolaminium carboxylate solutions were prepared containing 3, 10 and 66.3 wt.% of the 1:1 addition product of acetic acid and methyldiethanol amine. Each solution was employed in a pilot plant comprising an absorption column and steam stripper of conventional arrangement and tested for $SO_2$ absorption with the following results, at the conditions indicated. Samples A, C, D. and F of Example 1 contained $CO_2$ in the inlet gas stream in addition to $SO_2$, air and water vapor. The absorption data for these samples demonstrate that aqueous methyldiethanolaminium acetate solvents are highly selective absorption solvents for $SO_2$ in preference to $CO_2$ over a wide range of solvent loading, circulation rates and absorption temperatures. These data show that when sufficient methyldiethanolaminium acetate is circulated in contact with the gas containing both $SO_2$ and $CO_2$, essentially all the $SO_2$ can be recovered as shown in samples D and F. Insufficient reagent was circulated in sample A even though the volumetric circulation ratio, 0.18 gal./SCF of gas, was the same as for sample D where the concentration of methyldiethanolaminium acetate was much higher.

| TYPE OF BUFFER | 3 WT. % METHYLDIETHANOL-AMINIUM ACETATE (MDEAH.AcO) 97% $H_2O$ | | 3 WT. % MDEAH.AcO 97% $H_2O$ | 10 WT. % MDEAH.AcO 90% $H_2O$ | | |
|---|---|---|---|---|---|---|
| Test No. | A | B | C | D | E | F |
| Regeneration (Stripping) Temp., °F. | 220 | 219 | 218 | 217 | 216 | 222 |
| Absorption Temp., °F. | 80 | 81 | 79 | 82 | 83 | 83 |
| pH, Lean Sol'n | 4.0 | 4.0 | 3.3 | 4.1 | 3.5 | 4.0 |
| pH, Rich Sol'n | 2.0 | 2.0 | 2.2 | 2.6 | 2.4 | 2.0 |
| Liquid Flow, Gal/Hr | 1.57 | 3.15 | .41 | 1.10 | 1.04 | 1.10 |
| Inlet Gas, SCF/Hr | 13.3 | 9.4 | 7.07 | 6.1 | 12.4 | 12.7 |
| Circulation, Gal/SCF Inlet Gas | 0.118 | 0.334 | .058 | .180 | .084 | .087 |
| Mole % Composition Inlet Gas: | | | | | | |
| Air & $H_2O$ | 90.16 | 80.65 | 95.56 | 95.3 | 91.57 | 94.4 |
| $CO_2$ | 0.16 | — | 1.42 | 1.25 | — | .20 |
| $SO_2$ | 9.68 | 19.35 | 3.02 | 3.45 | 8.43 | 5.40 |
| Mole % Composition Outlet Gas: | | | | | | |
| Air & $H_2O$ | 92.73 | 96.98 | 97.9 | 98.75 | 97.9 | 99.8 |
| $CO_2$ | 0.16 | — | 1.39 | 1.25 | — | .20 |
| $SO_2$ | 7.11 | 3.02 | 0.71 | NIL | 2.10 | NIL |
| Solvent Loading SCF SO2/Gal of Solvent (Net) | 0.234 | 0.50 | 0.40 | 0.192 | 0.77 | 0.62 |
| Percent of Inlet | 28.59 | 86.6 | 76.8 | 100 | 76.6 | 100 |

|  |  | -continued |  |  |  |  |
|---|---|---|---|---|---|---|
| SO2 Absorbed Percent of Inlet CO2 Absorbed, (Calc.) | 2.8 | — | 4.3 | 3.5 | — | 5.4 |

|  | TYPE OF BUFFER | 66.3 WT. % MDEAH.AcO 33.7 WT. % WATER | | |
|---|---|---|---|---|
|  | Test No. | G | H | I |
|  | Regeneration (Stripping) Temp., °F. | 230 | 228 | 228 |
|  | Absorption Temp., °F. | 95 | 89 | 89 |
|  | pH, Lean Sol'n | 5.2 | 5.25 | 5.3 |
|  | pH, Rich Sol'n | 3.3 | 4.9 | 4.9 |
|  | Liquid Flow, Gal/Hr | 0.63 | 0.32 | 0.32 |
|  | Inlet Gas, SCF/Hr | 11.9 | 10.7 | 10.7 |
|  | Circulation, Gal/SCF Inlet Gas | 0.053 | 0.0294 | .0294 |
|  | Mole % Composition Inlet Gas: | | | |
|  | Air & H2O | — | — | — |
|  | CO2 | — | — | — |
|  | SO2 | 23.7 | 1.62 | 1.14 |
|  | Mole % Composition Outlet Gas: | | | |
|  | Air & H2O | — | — | — |
|  | CO2 | — | — | — |
|  | SO2 | 0.079 | 0.07 | 0.04 |
|  | Solvent Loading SCF SO2/Gal of Solvent (Net) | 4.46 | 0.522 | 0.368 |
|  | Percent of Inlet SO2 Absorbed | 99.7 | 96.3 | 96.5 |
|  | Normality, as $SO_3^=$, | | | |
|  | Lean Sol'n | 1.03 | 0.69 | 0.69 |
|  | Rich Sol'n | 1.70 | 1.07 | 1.07 |

Examples 2 and 3 illustrate the rate of oxidation of absorbed sulfur dioxide, measured as sulfite, to sulfate. Two solutions were tested; one being 35 wt.% MDEAH.AcO and 65 wt.% water; and the second 9.5 wt.% sodium sulfite in 90.5 wt.% water as a control sample to compare against the MDEAH.AcO solution.

EXAMPLE 2

A solution of MDEAH.AcO 35 wt.% and water 65 wt.% was placed in a stainless steel vessel inside a thermostatically controlled oven at 120° F. and bubbled with air after introduction of SO2 into the solution to make it 1.5N $SO_3^=$. The rate of air bubbling through a fritted bubbler was approximately 0.85 SCF/hr such that agitation was maintained with essentially a constant partial pressure of oxygen close to 3 psi. The vessel was approximately 60% full of liquid, starting out with about 290 cc of total liquid. The vapor exit was monitored and found to contain negligible amounts of SO2. The liquid was sampled periodically and was analysed for both sulfite and sulfate, using iodine for the sulfite and barium ppt. weighing for the sulfate, with the following results:

| Elapsed Time, | | Normalities in solution | |
|---|---|---|---|
| Hours | pH | $SO_3^=$ | $SO_4^=$ |
| Start | 5.3 | 1.50 | 0 |
| 2.45 | 5.1 | — | .304 |
| 7.17 | 5.0 | 1.09 | .668 |
| 16.3 | 4.9 | .076 | 1.57 |

| Elapsed Time, | | Normalities in solution | |
|---|---|---|---|
| Hours | pH | $SO_3^=$ | $SO_4^=$ |

(Approximate 10% volume loss due to evaporation.)

EXAMPLE 3

A solution of 9.5 wt.% sodium sulfite in 90.5 wt.% water was bubbled with air under the same conditions as in Example 2 and the sulfite and sulfate content monitored with the following results:

| Elapsed Time, Hrs. | pH | 14 N,$SO_3^=$ | N,$SO_4^=$ |
|---|---|---|---|
| Start | 6.8 | 1.65 | .06 |
| 1.75 |  | 1.65 |  |
| 5.0 | 5.45 | .51 | 1.03 |
| 8.25 | 3.3 | .092 | 1.17 (some SO2 stripped out) | p Examples 2 and 3 show that the most rapidly oxidized material was sodium sulfite. The sulfite solution oxidized to sulfate at about twice the rate of dissolved sulfite in the methyldiethanolaminium acetate solvent. In addition in the sulfite solution, at values below about pH5, SO2 began to strip out. No SO2 stripping was observed in methyldiethanolaminium acetate solution. The methyldiethanolaminium acetate solutions therefore appear to work much better than the sodium sulfite solutions presently used in some commercial processes.

Example 4 illustrates the high SO2 absorption capacity of a methyldiethanolaminium acetate solvent compared to the uncarboxylated amine, methyldiethanol amine, from which it was formed.

EXAMPLE 4

Two aqueous solutions were prepared. One comprised a solution of methyldiethanolamine containing 20% wt. water. The second solution comprised methyldiethanolaminium acetate containing 20% wt. water. A gas stream comprising 5% $SO_2$, 5% $CO_2$ and 90% air which was presaturated with water vapor at 84° F. was passed through equal volumes of each the above solutions while contained in a bubbler of 1 cc capacity. The absorption solutions were maintained at a constant temperature of 115° F. The outlet gas from the bubbler was passed into 200 cc of water until the pH of the water measured 4.7. The contact time of the gas stream with the absorption solutions in the bubbler was approximately 1.7 seconds. For each solution the following results were noted:

|  | MDEA 80% $H_2O$ 20% | MDEAH.AcO 80% $H_2O$ 20% |
|---|---|---|
| Normality of solvent at start | 6.99 | 4.65 |
| Gas volume, at STP, passed through bubbler until a water pH of 4.7 was obtained | 141 cc | 61.6 cc |
| Normality of resulting solvent by iodine titration | 2.36 | 7.44 |
| Total $SO_2$ absorbed as SCF/gal. | 3.73 | 11.8 |
| % approach to the $SO_3^=$/$HSO_3^-$ transition point. | 23.8 | 160 |
| % of inlet $SO_2$ absorbed | 15.1 | 92.6 |

The above data demonstrates the superiority of an alkanolaminium carboxylate solvent over that of the corresponding alkanolamine solvent for the selective absorption of $SO_2$, both in terms of the reaction rate for absorption and for the absorption capacity.

Examples 5 and 6 which follow illustrate the invention when triethanolaminium acetate is used as the absorption solvent.

EXAMPLE 5

A mole-for-mole mixture of triethanol amine and glacial acetic acid were mixed for reaction and then diluted with water to make a 35 wt.% solution of triethanolaminium acetate (referred to as TEAH.AcO). This mixture was then placed inside a stainless steel vapor-liquid equilibrium cell and various quantities of $SO_2$ were added in a series of tests to determine the vapor-liquid equilibria (solubilities) as shown in the following table:

| Partial Pressure of $SO_2$, psia | Liquid Phase Concentration as: | | pH |
|---|---|---|---|
|  | SCF $SO_2$/Gal | Normality as $SO_3$ |  |
| 0.127 | 3.10 | 1.96 | 4.5 |
| 0.355 | 3.70 | 2.34 | 3.7 |
| 1.03 | 4.76 | 3.01 | 3.2 |
| (Temperature 130° F.) | | | |

EXAMPLE 6

A 35% wt. solution of triethanolaminium acetate, prepared by adding acetic acid to triethanolamine at a 1:1 mole ratio and then dilution to 35 wt.% strength with water, was employed as the absorption solvent in a pilot plant comprising an absorption column and steam stripper of conventional arrangement. The plant was operated at various conditions and the results observed, all as noted in the table below:

| SUMMARY OF PILOT PLANT TESTS ON THE USE OF 35% wt. TEA.HOAC SOLUTIONS FOR $SO_2$ ABSORPTION FROM TAIL GAS | | | | | | |
|---|---|---|---|---|---|---|
| TEMPERATURES: °F. (1.61 Normal TEA.HOAC) | | | | | | |
| Reboiler | 215 | 215 | 215 | 215 | 215 | 215 |
| Solvent to absorb. | 120 | 120 | 120 | 124 | 120 | 85 |
| Solvent from absorb. | 129 | 129 | 125 | 135 | 125 | 95 |
| Avg. absorpt. temp. | 125 | 125 | 123 | 130 | 123 | 90 |
| LEAN SOLUTION: | | | | | | |
| pH | 4.8 | 4.85 | — | 4.6 | — | — |
| $N_{SO_3=}$ Equiv./l. | — | — | — | 1.30 | — | — |
| SCF $SO_2$/U.S. Gal. | — | — | — | 2.06 | — | — |
| Lb. moles TEA.HOAC/Gal. | .0134 | .0134 | .0134 | .0134 | .0134 | .0134 |
| Normality TEA.HOAC | 1.61 | 1.61 | 1.61 | 1.61 | 1.61 | 1.61 |
| Approx. Density, #/U.S. Gal. | 8.6 | 8.6 | 8.6 | 8.6 | 8.6 | 8.6 |
| $N_{SO_4=}$, Equiv./l. | — | — | — | 0.23 | — | — |
| RICH SOLUTION: | | | | | | |
| pH | 3.1 | 3.3 | — | 3.1 | — | — |
| $N_{SO_3=}$, Equiv./l. | — | — | — | 2.12 | — | — |
| SCF $SO_2$/U.S. Gal. | — | — | — | 3.35 | — | — |
| FLOW RATES: | | | | | | |
| Lean Solvent, gal./hr. | 0.81 | 0.81 | 0.81 | 0.81 | 0.81 | 0.81 |
| Residue Gas, SCF/Hf. | 9.28 | 9.28 | 13.0 | 7.84 | 11.1 | 9.92 |
| SUPERFICIAL V-L CONTACT TIME (Based on empty shell velocity & packed column height), minutes | 0.394 | 0.394 | 0.282 | 0.462 | 0.331 | 0.392 |
| CIRCULATION RATIO, U.S. Gal./SCF | 0.087 | 0.087 | 0.062 | 0.103 | 0.073 | 0.082 |
| COMPOSITION OF INLET GAS: | | | | | | |
| Mol % $CO_2$ | 81.08 | 85.09 | 86.23 | 82.47 | 84.69 | 88.47 |

| SUMMARY OF PILOT PLANT TESTS ON THE USE OF 35% wt. TEA.HOAC SOLUTIONS FOR SO₂ ABSORPTION FROM TAIL GAS | | | | | | |
|---|---|---|---|---|---|---|
| Mol % SO₂ | 9.38 | 7.91 | 6.77 | 10.53 | 8.31 | 8.53 |
| COMPOSITION OF RESIDUE GAS: | | | | | | |
| Mol % CO₂ | 90.01 | 92.9 | 92.51 | 92.91 | 92.79 | 96.94 |
| Mol % SO₂ | 0.19 | 0.099 | 0.49 | 0.093 | 0.206 | 0.061 |
| % OF SO₂ ABSORBED: | 98.16 | 98.85 | 92.27 | 99.21 | 97.72 | 99.35 |

Examples 5 and 6 show that triethanolaminium acetate is also an outstanding solvent for the preferential absorption of SO$_2$ from gas streams which also contain large quantities of CO$_2$.

Alkanolaminium carboxylate solvents, as described, are highly efficient absorption solvents for the preferential absorption of SO$_2$ from the presence of CO$_2$. Such solvents may be employed as aqueous solution containing preferably 15 to 65% wt. water. When so constituted they exhibit a high capacity for SO$_2$ and are preferably used to absorb SO$_2$ from gas streams at an absorption temperature of from about 75° to about 150° F., and most preferably at about 130° F. Such solvents, when loaded with dissolved SO$_2$ may be readily regenerated by thermal stripping at temperatures between about 220° to 300° F., depending in part upon the water content of the solvent, and most preferably at regeneration temperatures of about 240° to about 250° F. Such solvents efficiently absorb SO$_2$ over a wide range of circulation ratios such as 0.03 to about 0.5 gallons of solvent per standard cubic foot of inlet gas and over a wide range of liquid-gas contact times, such as 0.3 to about 1.0 minutes for a packed column.

Since the rate at which dissolved SO$_2$ oxidizes to sulfate in such solvents is greatly reduced, a small side stream of the regenerated solvent, from about 1 to about 2% by volume of the total solvent volume, may be treated to purge sulfates, hence keeping sulfate accumulation below a predetermined level. When the accumulated sulfate level is maintained below about 0.29 normal no observable permanent degradation of the alkanolaminium carboxylate has been observed even when high regeneration temperature, such as 300° F., has been employed.

The invention has been described and illustrated in terms of its preferred embodiments. Those of ordinary skill in the art, upon becoming aware of this disclosure, may make changes or alterations to the invention without departing from the scope and spirit thereof as described above or claimed below.

We claim:

1. A preferential absorption solvent for the absorption of sulfur dioxide, comprising:
an aqueous solution of an alkanolaminium carboxylate, wherein the alkanolaminium carboxylate is a compound of the formula

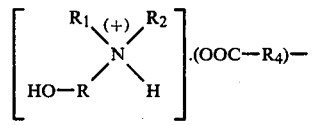

wherein R is an alkylene group having from 2 to 4 carbon atoms, R$_1$ and R$_2$ are each independently an alkanol group having from 2 to 4 carbon atoms or an alkyl group having from 1 to 4 carbon atoms or a hydrogen atom, and R$_4$ is an alkyl group of from 1 to 3 carbon atoms.

2. The absorption solvent of claim 1, wherein the alkanolaminium carboxylate is selected from the group consisting of triethanolaminium carboxylate, methyldiethanolaminium carboxylate, diisopropanolaminium carboxylate and diethanolaminium carboxylate.

3. The absorption solvent of claim 2, wherein the alkanolaminium carboxylate is triethanolaminium acetate.

4. The absorption solvent of claim 2, wherein the alkanolaminium carboxylate is methyldiethanolaminium acetate.

5. The absorption solvent of claims 1, 2, 3 or 4, wherein the alkanolaminium carboxylate comprises from about 35 to about 85% by weight of the aqueous solution.

6. The absorption solvent of claims 3 or 4, wherein the alkanolaminium carboxylate comprises from about 50 to about 60% by weight of the aqueous solution.

* * * * *